(12) United States Patent
Tseng et al.

(10) Patent No.: US 10,152,119 B2
(45) Date of Patent: Dec. 11, 2018

(54) HEAD-MOUNTED DISPLAY APPARATUS AND CALIBRATION METHOD THEREOF

(71) Applicant: HTC Corporation, Taoyuan (TW)

(72) Inventors: Wan-Ju Tseng, Taoyuan (TW); Jing-Lung Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 116 days.

(21) Appl. No.: 14/948,396

(22) Filed: Nov. 23, 2015

(65) Prior Publication Data

US 2016/0171675 A1 Jun. 16, 2016

Related U.S. Application Data

(60) Provisional application No. 62/090,376, filed on Dec. 11, 2014.

(51) Int. Cl.
| | |
|---|---|
| *G06F 3/01* | (2006.01) |
| *G06F 3/03* | (2006.01) |
| *G06F 3/0346* | (2013.01) |
| *G06F 3/038* | (2013.01) |
| *G02B 27/01* | (2006.01) |

(Continued)

(52) U.S. Cl.
CPC ........... *G06F 3/012* (2013.01); *G02B 27/017* (2013.01); *G06F 3/0304* (2013.01); *G06F 3/0346* (2013.01); *G06F 3/0383* (2013.01); *G06F 3/0484* (2013.01); *G06F 3/04842* (2013.01); *G06T 7/85* (2017.01); *G02B 2027/011* (2013.01); *G02B 2027/014* (2013.01); *G02B 2027/0138* (2013.01); *G02B 2027/0198* (2013.01); *G06T 2207/10028* (2013.01);

(Continued)

(58) Field of Classification Search
None
See application file for complete search history.

(56) References Cited

U.S. PATENT DOCUMENTS

| | | | | |
|---|---|---|---|---|
| 2003/0184860 A1* | 10/2003 | Hakkinen | ................ | G02B 7/12 359/480 |
| 2010/0328437 A1* | 12/2010 | Lee | ........................ | G01C 11/06 348/47 |

(Continued)

FOREIGN PATENT DOCUMENTS

| | | |
|---|---|---|
| CN | 103838365 | 6/2014 |
| TW | 201421071 | 6/2014 |

OTHER PUBLICATIONS

"Office Action of Taiwan Counterpart Application", dated Sep. 5, 2016, p. 1-p. 4.

(Continued)

*Primary Examiner* — Ifedayo B Iluyomade
(74) *Attorney, Agent, or Firm* — JCIPRNET

(57) ABSTRACT

A head mounted display apparatus and a calibrating method thereof are provided. The HMD apparatus has a dual camera unit. The method includes: disposing a reference object in front of the dual camera unit, wherein the reference object has at least one physical feature; capturing a plurality of images of the reference object by the dual camera unit, and generating a distance information of the reference object according to the images; determining whether the dual camera unit being deformed or not by analyzing the distance information; and calibrating the HMD apparatus if the dual camera unit being deformed.

24 Claims, 6 Drawing Sheets

(51) Int. Cl.
*G06F 3/0484* (2013.01)
*G06T 7/80* (2017.01)
(52) U.S. Cl.
CPC ............... *G06T 2207/30196* (2013.01); *G06T 2207/30204* (2013.01)

(56) References Cited

U.S. PATENT DOCUMENTS

2013/0120224 A1\* 5/2013 Cajigas .................... G09G 5/00
                                                    345/8
2013/0335303 A1\* 12/2013 Maciocci ................ G06F 3/011
                                                    345/8

OTHER PUBLICATIONS

"Office Action of China Counterpart Application," dated Aug. 23, 2017, p. 1-p. 6.

\* cited by examiner

HEAD-MOUNTED DISPLAY APPARATUS AND CALIBRATION METHOD THEREOF

CROSS-REFERENCE TO RELATED APPLICATION

This application claims the priority benefits of U.S. provisional application Ser. No. 62/090,376, filed on Dec. 11, 2014. The entirety of the above-mentioned patent application is hereby incorporated by reference herein and made a part of this specification.

BACKGROUND

Field of the Invention

The invention relates to a head mounted display (HMD) apparatus and a calibrating method thereof Particularly, the invention relates to a HMD apparatus capable of calibrating shifts of a dual camera unit thereof Description of Related Art The wearable interaction device is one of the most prospective fields which the international companies are enthusiastically lay out the plan for after the development of the smart phone. The head mounted display (HMD) apparatus is one of the key devices in this field. The head mounted display apparatuses may be classified into immersion-type head mounted apparatuses and see-through-type head mounted displays.

In real use, positions of cameras in the HMD apparatus may be varied because of some unavoidable reason. Such as that, for composing the real image and the virtual image produced by the HMD apparatus, a calibration operation is necessary. In conventional art, a special instrument is needed for the calibration operation, and the calibration operation can be operated only in a specified place (such as a lab or a factory). The convenience of the HMD apparatus is improved correspondingly.

SUMMARY OF THE INVENTION

The disclosure is directed to HMD apparatus and a calibrating method thereof, which can effectively calibrate shifts of a dual camera unit of the HMD apparatus.

The disclosure provides a calibrating method for calibrating a head mounted display (HMD apparatus) apparatus with a dual camera unit. The method includes: disposing a reference object in front of the dual camera unit, wherein the reference object has at least one physical feature; capturing a plurality of images of the reference object by the dual camera unit, and generating a distance information of the reference object according to the images; determining whether the dual camera unit being deformed or not by analyzing the distance information; and calibrating the HMD apparatus if the dual camera unit being deformed.

The disclosure provides a head mounted display (HMD) apparatus. The HMD apparatus includes a dual camera unit and a host device. The dual camera unit is used for capturing a plurality of images of a reference object. The host device is coupled to the dual camera unit, and is configured for generating a distance information of the reference object according to the images; determining whether the dual camera unit being deformed or not by analyzing the distance information; and calibrating the HMD apparatus if the dual camera unit being deformed.

According to the above descriptions, in the disclosure, the HMD apparatus may simply determine whether the dual camera unit is deformed or not by a reference object. Moreover, the dual camera unit can be calibrated by a depth info nation obtained based on the reference object. That is, the dual camera unit can be calibrated by user, and the calibration operation can be easily and quickly achieved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the present disclosure, a calibration method for a dual camera unit of a head mounted display (HMD) apparatus is provided, wherein the dual camera unit is capable of simultaneously capturing images. A host device with a depth engine is connected to the HMD apparatus, and the depth engine of the host device is capable of generating a distance information by processing the images, wherein the depth engine can be a software or a circuit.

Figure 1:
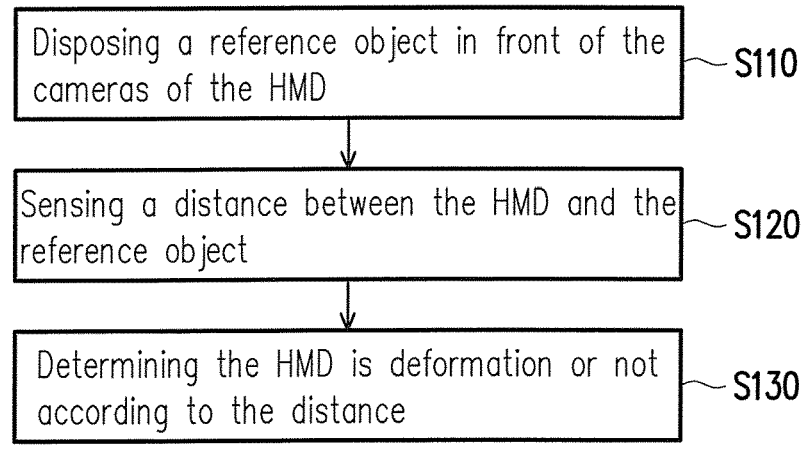
FIG. 1 illustrates a flow chart for judging whether the dual camera unit of the HMD apparatus is deformed or not according to an embodiment of the present disclosure.

FIG. 1 illustrates a flow chart for judging whether the dual camera unit of the

HMD apparatus is deformed or not according to an embodiment of the present disclosure. In FIG. 1, during a deformation detecting mode, a reference object is disposed in front of the dual camera unit of the HMD apparatus, and the reference object has at least one physical feature, such as color, shape, edge, etc. (step S110). In step S120, the dual camera unit can capture the images of the reference object, and the host device may generate the distance information corresponding to the reference object by sensing a distance between the HMD apparatus and the reference object. In step S130, by analyzing the distance information, the host device can determine whether the dual camera unit is deformed or not according to the distance.

In one embodiment, the reference object ROBJ may be a user's hand. The host device may indicate the user to hold his arm straight and put his hand in front of the dual camera unit. And then the dual camera unit can capture the images of the user's hand. The dual camera unit can also automatically capture images of the user's hand when the user raises his hand.

Moreover, the distance information can comprise a depth map corresponding to the reference object on the images, wherein the depth map is distributed with different values to represent the distance information of each pixel on the depth map corresponding to the reference object. A distribution of the values on the depth map can be called as a depth density. The host device can analyze the continuity or fragmented condition of the depth density on the depth map corresponding to the reference object. If the depth map shows a poor continuity or an abnormal broken condition, the host device can determine that the dual camera unit has been deformed. For example, in a normal situation, the depth density corresponding to the reference object (such as the hand portion of the user) on the depth map should be continuously distributed or have a clear edge. If the depth density corresponding to the hand portion abruptly changes between high and low values over a region, the host device can determine that the depth map has an abnormal broken condition and that the dual camera unit has been deformed.

Besides, the distance information can also comprise a sensing distance SD calculated by the host device by using images captured by the dual camera unit of the HMD apparatus, wherein the sensing distance SD is corresponding to the distance between the reference object ROBJ and the dual camera unit. Further, the depth engine of the host device may obtain the sensing distance based on a parallax of the images. The host device can compare the sensing distance SD with a reference distance. If the sensing distance SD differs from the reference distance over a predetermined range, the host device can determine that the dual camera unit is deformed, wherein the reference distance may be preset by a length of arms of human. For example, the preset distance may be set to 50-80 cm. Moreover, the reference distance can also be the distance between the HMD apparatus and the reference object ROBJ measured by a distance detecting unit of the HMD apparatus.

In another embodiment, the reference object ROBJ can be a position reference device located at a distance away from the HMD apparatus for wirelessly providing a reference information to a communication interface, such as a transceiver of the HMD apparatus. Then the communication interface can forward the reference information to the host device for further processing. The host device can use the reference information to generate a reference distance corresponding to the distance between the remote object and the HMD apparatus. Further, the depth engine of the host device may obtain the sensing distance SD of the remote object based on the images of the remote object captured by the dual camera unit. The host device can compare the sensing distance SD with the reference distance. If the sensing distance SD differs from the reference distance over a predetermined range, the host device can determine that the dual camera unit is deformed.

Figure 2A:
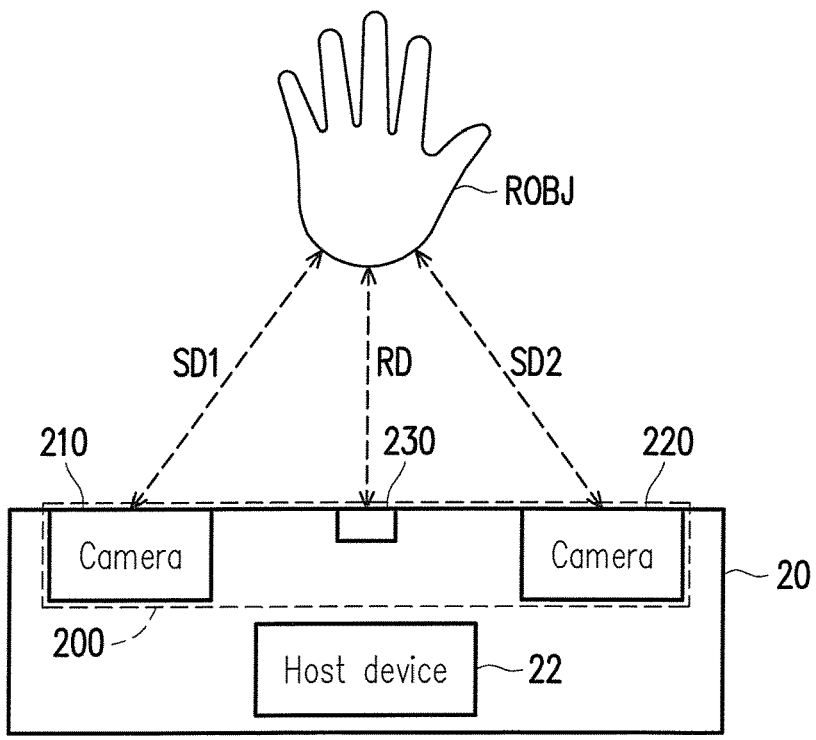
FIG. 2A illustrates a block diagram of a HMD apparatus 20 according to an embodiment of the present disclosure.

Please refer to FIG. 2A, FIG. 2A illustrates a block diagram of a HMD apparatus 20 according to an embodiment of the present disclosure. In FIG. 2A, the dual camera unit 200 of the HMD apparatus 20 includes a first camera 210 and a second camera 220.

A host device 22 is connected to the dual camera unit 200 of the HMD apparatus 20 for generating the distance information. The dual camera unit 200 can capture images of the reference object ROBJ, and the host device 22 may generate the distance information of the reference object ROBJ based on the captured images.

For detecting the deformation status of the dual camera unit 200, a reference distance RD between the reference object ROBJ and the dual camera unit 200 can be measured by a distance detecting unit 230. The distance detecting unit 230 can be disposed on the HMD apparatus 20. Any distance detecting skill known to a person skilled in the art can be applied to the distance detecting unit 230. For example, the distance detecting unit 230 can be a time of flight (TOF) system, RF (radio frequency) or IR (infra-red ray) distance detecting unit. The depth engine of the host device 22 may obtain the sensing distances SD1 and SD2 of the reference object ROBJ based on the images of reference object ROBJ captured by the dual camera unit 200. The host device 22 can compare the sensing distances SD 1 and SD2 with the reference distance RD. If the sensing distances SD1 and SD2 differ from the reference distance RD over a predetermined range, the host device 22 can determine that the dual camera unit 200 is deformed. In FIG. 2A, the host device 22 may be embedded in the HMD apparatus 20. The host device 22 may obtain the sensing distances SD1, SD2 from the cameras 210 and 220, and obtain the reference distance RD from the distance detecting unit 230. Thus, the host device 22 can determine whether the dual camera unit 200 is deformed or not, and a calibrating operation can be operated accordingly.

Figure 2B:
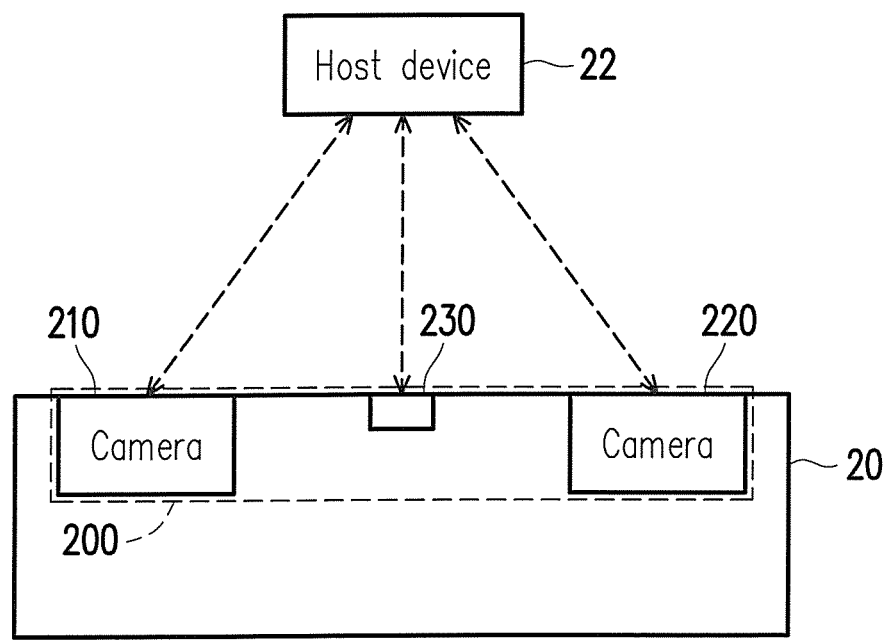
FIG. 2B illustrates another block diagram of a HMD apparatus 20 according to another embodiment of the present disclosure.

Referring to FIG. 2B, FIG. 2B illustrates another block diagram of a HMD apparatus 20 according to another embodiment of the present disclosure. In FIG. 2B, the host device 22 is external from the HMD apparatus 20. In this embodiment, the host device 22 may provide as the reference object ROBJ, and the reference object ROBJ is disposed in a distant position away from the HMD apparatus 20. The HMD apparatus 20 may sense the images of the reference object ROBJ, and provides the sensing images to the host device 22 wirelessly.

Figure 3:
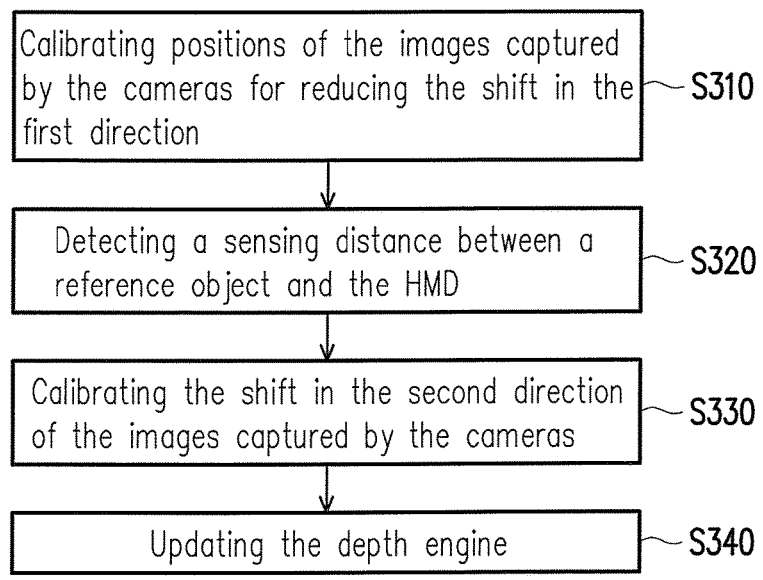
FIG. 3 illustrates a flow chart for calibrating the depth engine of the host device 22 according to an embodiment of the present disclosure.

FIG. 3 illustrates a flow chart for calibrating the depth engine of the host device 22 according to an embodiment of the present disclosure. If the dual camera unit 200 is determined to be deformed during the deformation detecting mode, a calibration operation may be operated on the depth engine of the host device 22. In step S310, position information of the reference object ROBJ on the images captured by the first and second camera 210 and 220 are calculated for calibrating positions of the images captured by the first and second camera 210 and 220 for reducing a shift in a first direction, wherein the first and second camera 210 and 220 are arranged in a second direction on the HMD apparatus 20, and the first and second direction are substantially perpendicular.

Figure 4:
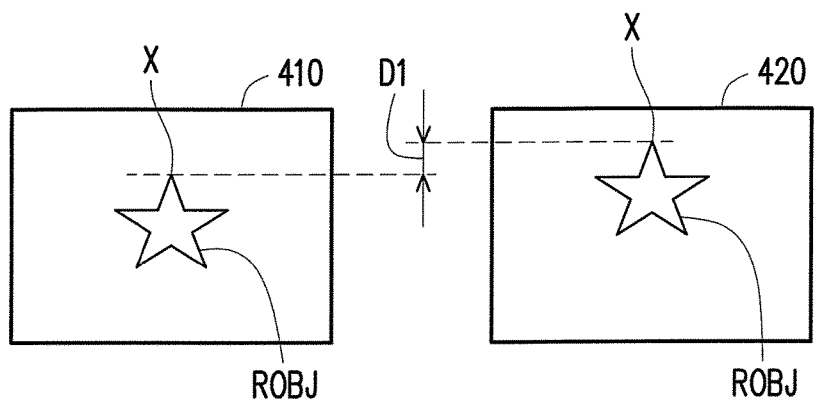
FIG. 4 illustrates the images captured by the first and second camera 210 and 220 according to an embodiment of the present disclosure.

FIG. 4 illustrates the images captured by the first and second camera 210 and 220 according to an embodiment of the present disclosure. The first and second cameras 210 and 220 may simultaneously capture images of the reference object ROBJ and respectively generate a first image 410 and a second image 420. By comparing the first image 410 and the second image 420, there is a relative position difference (parallax) between the positions of a certain point X of the reference object ROBJ in both the first image 410 and the second image 420, wherein the certain point X may be one of a plurality of feature points of the reference object ROBJ. For example, the certain point X can be a point on an edge of the reference object ROBJ. In FIG. 4, the position of the point X in the second image 420 is higher than that in the first image 410 by a distance D1. The distance D1 may be provided as the position information for calibrating the shift in the first direction of the first image 410 and the second image 420.

Please be noted here, the reference object ROBJ may be provided by the user (such as the user's hand). Moreover, the reference object ROBJ may also be a distant object away from the HMD apparatus 20 and the distant object is sensible by the dual camera unit 200 of the HMD apparatus 20.

In step S320, the sensing distance between the HMD apparatus 20 and the reference object ROBJ is detected.

Figure 5:
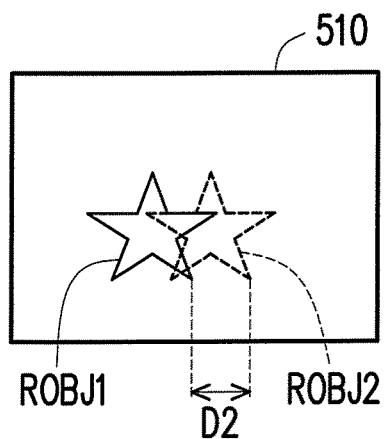
FIG. 5 illustrates an image plot of images captured by the first and second cameras 210 and 220 according to an embodiment of the present disclosure.

Please refer to FIG. 5, FIG. 5 illustrates an image plot of images captured by the first and second cameras 210 and 220 according to an embodiment of the present disclosure. In FIG. 5, the image plot 510 is generated by overlapping two images (such as images 410 and 420 in FIG. 4) captured by the first and second cameras 210 and 220.

In the image plot 510, an image ROBJ1 of the reference object ROBJ is obtained by the first camera 210, and an image ROBJ2 of the reference object ROBJ is obtained by the second camera 220. There is a distance D2 in the second direction between the image ROBJ1 and the image ROBJ2 in the image plot 510, wherein the distance D2 may be obtained by one feature point of the image ROBJ1 and corresponding feature point of the image ROBJ2.

In step S330, a shift in the second direction of the images captured by the cameras is calibrated. If the first and second cameras of the HMD apparatus 20 are deformed, the sensing distance SD calculated based on the distance D2 may be larger or smaller than the preset distance. And a calibration operation on the first image 410 and the second image 420 in the second direction is needed. A difference between the reference distance and the sensing distance SD is calculated based on the distance D2 by the host device 22. Accordingly, the depth engine can calibrate the shift in the second direction of the first image 410 and the second image 420 based on the aforementioned difference calculated during the calibration operation.

Referring to FIG. 3 again, after the shifts in the first and second directions of the first image 410 and the second image 420 are calibrated, the calibration operation of the depth engine of the host device 22 is finished. The shifts in the first and second directions of the first image 410 and the second image 420 can be stored as calibration data. The host device can update the depth engine based on the calibration data in step S340.

Figure 6A:
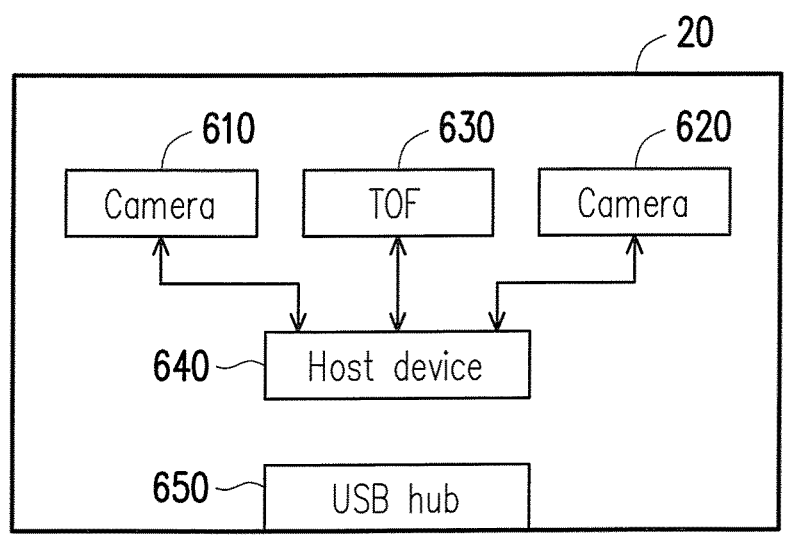
FIG. 6A illustrates a block diagram of HMD apparatus 20 according to an embodiment of the present disclosure.

Please refer to FIG. 6A, FIG. 6A illustrates a block diagram of the HMD apparatus 20 according to an embodiment of the present disclosure. The HMD apparatus 20 includes cameras 610, 620, a TOF (time of flight) 630, a host device 640, and an USB hub 650. A reference distance between the user's hand and the HMD apparatus 600 can be obtained by the TOF 630, wherein the TOF 630 is a distance detection unit. By comparing the sensing distance obtained by the cameras 610 and 620 and the reference distance obtained by the TOF 630, the host device 640 also can determine whether the cameras 610 and 620 are deformed and perform the calibration operation for the depth engine of the host device 640 accordingly.

Figure 6B:
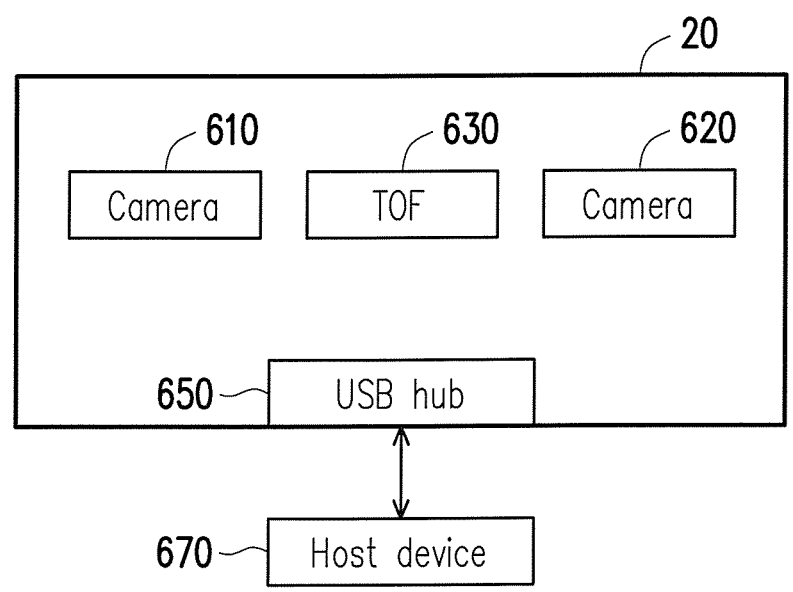
FIG. 6B illustrates a block diagram of HMD apparatus 20 according to another embodiment of the present disclosure.

Please refer to FIG. 6B, FIG. 6B illustrates a block diagram of the HMD apparatus 20 according to another embodiment of the present disclosure. The HMD apparatus 20 includes the cameras 610 and 620, the TOF 630, and a USB hub 650. In this embodiment, the host device 670 is disposed externally from the HMD apparatus 20, and the host device 670 may be coupled to the HMD apparatus 20 through the USB hub 650.

Figure 7:
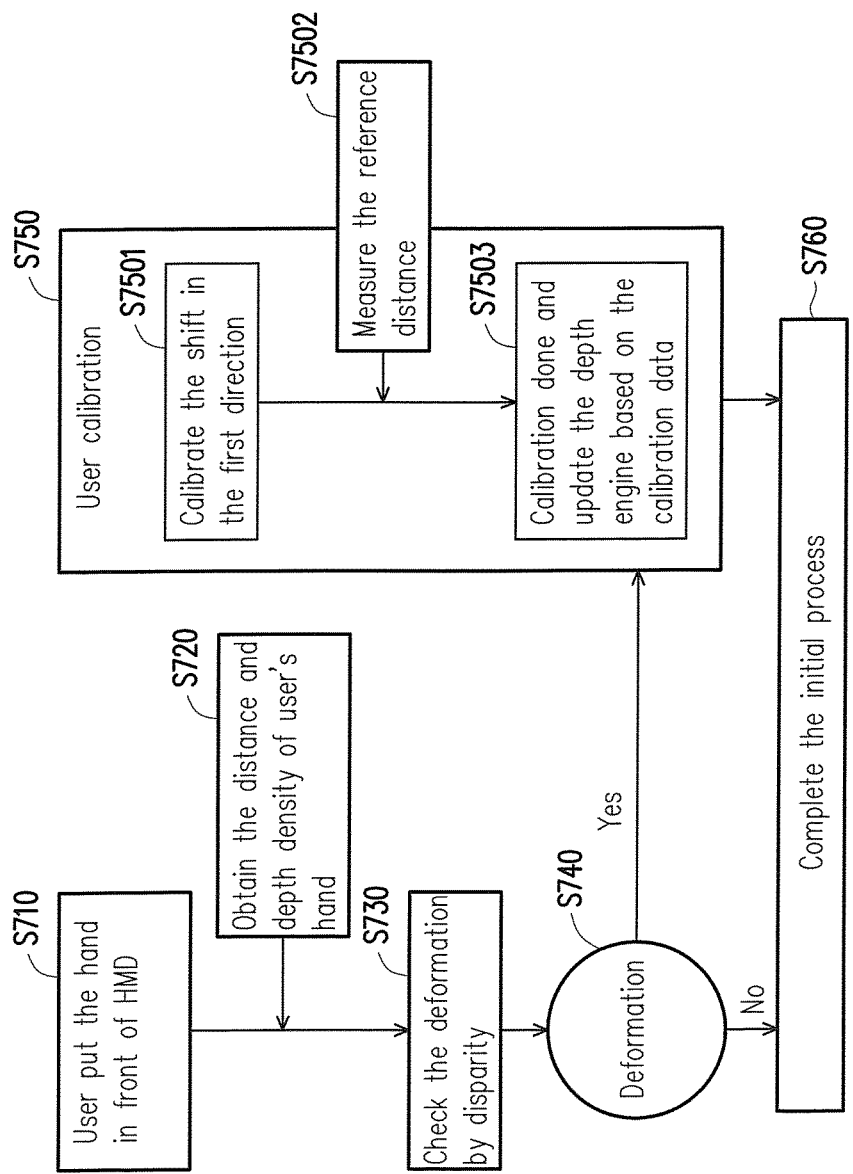
FIG. 7 illustrates a flow chart of an initial process for the HMD apparatus according to an embodiment of the present disclosure.

Please refer to FIG. 7, FIG. 7 illustrate a flow chart of an initial process for the HMD apparatus according to an embodiment of the present disclosure. In step S710, the user may put his hand in front of the HMD apparatus. The host device may obtain the distance and depth density of the user's hand on the sensing images in step S720. In step S730, the HMD apparatus checks the deformation by disparity of the images of the hand of the user, and the deformation of the HMD apparatus can be determined in step S740. If the deformation of the HMD apparatus is determined to be "yes", step S750 can be executed, and if the deformation of the HMD apparatus is determined to be "no", the initial process is completed (step S760).

In step S750, a calibration operation is operated. Firstly, in step 7501, the host device of the HMD apparatus can calibrate for reducing the shift in the first direction of the images captured by the dual camera unit based on the user's hand shown on the images captured by the dual camera unit (As illustrated in FIG. 4). Secondly, a position reference device can be provided in a distant position away from the HMD apparatus, and the reference distance between the position reference device and the HMD apparatus is measured (step S7502). Then, the shift in the second direction of the images captured by the dual camera unit can be calibrated by comparing the reference distance measured in step S7502 and a sensing distance obtained by the HMD apparatus. In step S7503, after all of the calibration operations have been done, the shift in the first and second directions of the images captured by the dual camera unit can be stored as calibration data. The host device can update the depth engine based on the calibration data. Furthermore, the initial process is completed after step S7503 is finished.

In summary, in the present disclosure, the calibration operation is operated by using the host device, and the host device may be a chip in the HMD apparatus or an electronic apparatus with a powerful processor. That is, the calibration operation can be operated by the user easily, and the efficiency of the HMD apparatus can be improved.

The calibration method of the present application can be applied to, but not limited to, the dual camera unit of the HMD apparatus. For example, the calibration method of the present application can be applied to any electronic device with a dual camera unit or a single camera unit, with various alterations and modifications without departing from the scope and spirit of the present application.

In summary, the calibration of the HMD apparatus can be easily achieved by a referenced object (such as user's hand), and the efficiency for using the HMD apparatus is improved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A calibration method for a head mounted display (HMD) apparatus with a dual camera unit, comprising:
  disposing a reference object in front of the dual camera unit, wherein the reference object has at least one physical feature;
  capturing a plurality of images of the reference object by the dual camera unit, and generating a distance infor- mation of the reference object according to the images, wherein the distance information includes a sensing distance;

determining whether the dual camera unit is deformed or not by analyzing the distance information;

comparing the sensing distance with a reference distance, wherein the reference distance is a preset value; and calibrating the HMD apparatus if the dual camera unit is deformed, wherein the step of calibrating the HMD apparatus if the dual camera unit is deformed comprises:

calculating a shift in a first direction of the images according to a plurality of position information, wherein a first and second cameras of the dual camera unit are arranged in a second direction, and the first and second direction are substantially perpendicular.

2. The calibration method as claimed in claim 1, wherein the distance information comprises a depth map, and the depth map corresponds to the reference object on the images, the depth map is distributed with a plurality of values for representing the distance information of each of a plurality of pixels on the depth map corresponding to the reference object, wherein the values on the depth map is a depth density.

3. The calibration method as claimed in claim 2, wherein the step of determining whether the dual camera unit is deformed or not by analyzing the distance information comprises:

analyzing a continuity or fragmented condition of the depth density on the depth map corresponding to the reference object; and determining whether the dual camera unit is deformed or not according to the continuity or fragmented condition.

4. The calibration method as claimed in claim 2, wherein the sensing distance is corresponding to a distance between the reference object and the dual camera unit.

5. The calibration method as claimed in claim 4, wherein the sensing distance is obtained based on a parallax of the images.

6. The calibration method as claimed in claim 4, wherein the step of determining whether the dual camera unit is deformed or not by analyzing the distance information comprises:

determining whether the dual camera unit is deformed or not by determining whether the sensing distance differs from the reference distance over a predetermined range or not.

7. The calibration method as claimed in claim 6, wherein the reference distance is between 50-80 cm.

8. The calibration method as claimed in claim 1, wherein the step of calibrating the HMD apparatus if the dual camera unit is deformed comprises:

calculating the position information respectively corresponding to the images; and calibrating a shift in the first direction of the first and second cameras by updating the depth information according to the shift in the first direction between the images.

9. The calibration method as claimed in claim 8, wherein the step of calibrating the HMD apparatus if the dual camera unit is deformed further comprises:

calculating a parallax of the images based on a certain point of the reference object; and calibrating a shift in the second direction of the first and second cameras by updating the depth information according to the parallax.

10. The calibration method as claimed in claim 8, wherein the step of calibrating the HMD apparatus if the dual camera unit is deformed further comprises:

detecting a sensing distance between the reference object and the HMD apparatus;

comparing the sensing distance and a preset distance to generate a comparing result; and calibrating the shift in the second direction of the images according to the comparing result by updating the depth information.

11. The calibration method as claimed in claim 8, wherein the step of calibrating the HMD apparatus if the dual camera unit is deformed further comprises:

updating a depth engine based on the depth map.

12. A head mounted display (HMD) apparatus, comprising:

a dual camera unit, for capturing a plurality of images of a reference object; and a host device, coupled to the dual camera unit, configured for:

generating a distance information of the reference object according to the images, wherein the distance information includes a sensing distance;

determining whether the dual camera unit is deformed or not by analyzing the distance information;

comparing the sensing distance with a reference distance, wherein the reference distance is a preset value; and calibrating the HMD apparatus if the dual camera unit is deformed, wherein the host device is configured to calculate a shift in a first direction of the images according to a plurality of position information, wherein a first and second cameras of the dual camera unit are arranged in a second direction, and the first and second direction are substantially perpendicular.

13. The HMD apparatus as claimed in claim 12, wherein the distance information comprises a depth map, and the depth map corresponds to the reference object on the images, the depth map is distributed with a plurality of values for representing the distance information of each of a plurality of pixels on the depth map corresponding to the reference object, wherein the values on the depth map is a depth density.

14. The HMD apparatus as claimed in claim 13, wherein the host device is configured to analyze a continuity or fragmented condition of the depth density on the depth map corresponding to the reference object, and to determine whether the dual camera unit is deformed or not according to the continuity or fragmented condition.

15. The HMD apparatus as claimed in claim 14, wherein the sensing distance is corresponding to a distance between the reference object and the dual camera unit.

16. The HMD apparatus as claimed in claim 14, wherein the host device obtains the sensing distance based on a parallax of the images.

17. The HMD apparatus as claimed in claim 14, wherein the host device is configured to determine whether the dual camera unit is deformed or not by determining whether the sensing distance differs from the reference distance over a predetermined range or not.

18. The HMD apparatus as claimed in claim 17, wherein the reference distance is between 50-80 cm.

19. The HMD apparatus as claimed in claim 17, wherein the host device is configured to calculate the position information respectively corresponding to the images, and to calibrate a shift in the first direction of the first and second cameras by updating the depth information according to the shift in the first direction between the images.

20. The HMD apparatus as claimed in claim 19, wherein the host device is further configured to calculate a parallax of the images based on a certain point of the reference object, and to calibrate a shift in the second direction of the first and second cameras by updating the depth information according to the parallax.

21. The HMD apparatus as claimed in claim 19, wherein the HMD apparatus further comprises:

a distance detecting unit, coupled to the host device, the distance detecting unit is configured to detect a sensing distance between the reference object and the HMD apparatus, wherein the host device is further configured to compare the sensing distance and a preset distance to generate a comparing result, and to calibrate the shift in the second direction of the images according to the comparing result by updating the depth information.

22. The HMD apparatus as claimed in claim 19, wherein the host device is further configured to update a depth engine based on the depth map of the depth information.

23. The HMD apparatus as claimed in claim 19, wherein the host device is embedded in the HMD apparatus or external from the HMD apparatus.

24. The HMD apparatus as claimed in claim 23, wherein the HMD apparatus further comprises:

a communication interface, for wirelessly receiving a reference distance from the reference object.

* * * * *